United States Patent
Lin

(10) Patent No.: US 11,665,772 B2
(45) Date of Patent: May 30, 2023

(54) APPARATUSES AND METHODS FOR SMALL DATA TRANSMISSION IN A RADIO RESOURCE CONTROL (RRC) INACTIVE STATE

(71) Applicant: Acer Incorporated, New Taipei (TW)

(72) Inventor: Jung-Mao Lin, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 17/363,439

(22) Filed: Jun. 30, 2021

(65) Prior Publication Data
US 2022/0046749 A1 Feb. 10, 2022

Related U.S. Application Data

(60) Provisional application No. 63/063,435, filed on Aug. 10, 2020.

(51) Int. Cl.
| | |
|---|---|
| *H04W 76/30* | (2018.01) |
| *H04W 76/19* | (2018.01) |
| *H04W 24/08* | (2009.01) |
| *H04W 28/02* | (2009.01) |
| *H04W 74/08* | (2009.01) |

(52) U.S. Cl.
CPC .......... *H04W 76/30* (2018.02); *H04W 24/08* (2013.01); *H04W 28/0231* (2013.01); *H04W 74/0833* (2013.01); *H04W 76/19* (2018.02)

(58) Field of Classification Search
CPC ..... H04W 76/19; H04W 76/27; H04W 76/30; H04W 74/0833; H04W 28/0231; H04W 24/08
See application file for complete search history.

(56) References Cited

U.S. PATENT DOCUMENTS

| | | | |
|---|---|---|---|
| 2021/0227586 A1* | 7/2021 | Huang | H04W 52/242 |
| 2021/0259021 A1* | 8/2021 | Huang | H04W 76/10 |
| 2021/0307055 A1* | 9/2021 | Tsai | H04W 76/27 |

(Continued)

FOREIGN PATENT DOCUMENTS

| | | |
|---|---|---|
| JP | 2006245887 A | 9/2006 |
| WO | 2020/088097 A1 | 5/2020 |

OTHER PUBLICATIONS

Nokia (rapporteur), Nokia Shanghai Bell; "Stage-2 running CR for2-step RACH"; 3GPP TSG-RAN WG2 Meeting #108 Reno, USA, Nov. 18-22, 2019; R2-1915889 (Year: 2019).*

(Continued)

*Primary Examiner* — Gary Mui
(74) *Attorney, Agent, or Firm* — McClure, Qualey & Rodack, LLP

(57) ABSTRACT

A method executed by a User Equipment (UE) communicatively connected to a mobile communication network is provided. The UE operates in a Radio Resource Control (RRC) inactive state as configured by the mobile communication network. In response to a Small Data Transmission (SDT) procedure being triggered in the RRC inactive state, the UE monitors a signal quality of a serving cell of the mobile communication network or determines a traffic type of data to be transmitted in the SDT procedure. The UE determines whether to perform the SDT procedure based on the signal quality of the serving cell or the traffic type of the data.

17 Claims, 12 Drawing Sheets

(56) References Cited

U.S. PATENT DOCUMENTS

| | | | | |
|---|---|---|---|---|
| 2021/0307073 A1* | 9/2021 | Huang | | H04W 74/0833 |
| 2021/0315049 A1* | 10/2021 | Wei | | H04W 76/36 |
| 2021/0337625 A1* | 10/2021 | Tsai | | H04W 76/19 |
| 2021/0345208 A1* | 11/2021 | Rugeland | | H04W 36/08 |
| 2021/0410180 A1* | 12/2021 | Tsai | | H04W 72/042 |
| 2022/0022266 A1* | 1/2022 | Agiwal | | H04W 74/004 |
| 2022/0094495 A1* | 3/2022 | Wang | | H04W 74/0833 |
| 2022/0124866 A1* | 4/2022 | Xu | | H04W 74/0833 |
| 2022/0232659 A1* | 7/2022 | Kim | | H04W 72/1289 |
| 2022/0279594 A1* | 9/2022 | Chen | | H04W 28/0263 |

OTHER PUBLICATIONS

ZTE Corporation; "New Work Item on NR small data transmissions in Inactive state"; 3GPP TSG RAN Meeting #86 Sitges, Spain, Dec. 9-12, 2019; RP-193252 (Year: 2019).*

Ericsson; "Details of solution B for small data transmission in RRC_Inactive" 3GPP TSG-RAN WG2 #97 Tdoc Athens, Greece, Feb. 13-17, 2017; R2-1700890 (Year: 2017).*

Extended European Search Report dated Jan. 11, 2022, issued in application No. EP 21189307.8.

Samsung; "Random Access based Small Data Transmission-Details;" 3GPP TSG-RAN2 Meeting #111; Aug. 2020; pp. 1-6.

Samsung; "Random Access based Small Data Transmission-Signal Flow;" 3GPP TSG-RAN2 Meeting #111; Aug. 2020; pp. 1-6.

JP Office Action dated Jul. 20, 2022 in application No. 2021-129320.

Huawei, HiSilicon: "Common aspects between RACH and CG-based scheme"; 3GPP TSG-RAN WG2 Meeting #111-e; Electronic, Aug. 17-28, 2020.

Japanese language office action dated Nov. 15, 2022, issued in application No. JP 2021-129320.

Qualcomm Incorporated; "Rach based NR small data transmission;" 3GPP TSG-RAN WG2 Meeting #111e Online; Aug. 2020; pp. 1-7.

APPLE; "Small data transmission via RACH Procedure;" 3GPP TSG-RAN WG2 Meeting #111-e; Aug. 2020; pp. 1-6.

* cited by examiner

APPARATUSES AND METHODS FOR SMALL DATA TRANSMISSION IN A RADIO RESOURCE CONTROL (RRC) INACTIVE STATE

CROSS REFERENCE TO RELATED APPLICATIONS

This application claims priority under 35 U.S.C. § 119 from U.S. Provisional Application No. 63/063,435, entitled "Method of small data transmissions in inactive state", filed on Aug. 10, 2020, the subject matter of which is incorporated herein by reference.

BACKGROUND OF THE APPLICATION

Field of the Application

The application generally relates to mobile communications and, more particularly, to apparatuses and methods for Small Data Transmission (SDT) in a Radio Resource Control (RRC) inactive state.

Description of the Related Art

In a typical mobile communication environment, a User Equipment (UE) (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and New Radio (NR) technology etc. In particular, GSM/GPRS/EDGE technology is also called 2G technology; WCDMA/CDMA-2000/TD-SCDMA technology is also called 3G technology; LTE/LTE-A/TD-LTE technology is also called 4G technology; and NR technology is also called 5G technology.

The Radio Resource Control (RRC) protocol is used on the air interface. The major functions of the RRC protocol include connection establishment and release functions, broadcast of system information, radio bearer establishment, reconfiguration and release, RRC connection mobility procedures, paging notification and release, and outer loop power control. The operation of the RRC is guided by a state machine which defines specific states that a UE may be present in. Different RRC states have different amounts of radio resources associated with them, and these are the resources that the UE may use when it is present in a given RRC state. In 4G systems, the RRC states includes an idle state and a connected state. After being powered up, a UE is in the idle state and in order to perform data transfer or to make/receive voice calls, the UE need to establish a connection with the network. Once the connection is established, the UE enters the connected state. Apart from the idle state and the connected state, 5G NR has introduced a new RRC state called the inactive state which is designed to allow the UE to transmit data without entering the connected state, thereby saving the time and radio resources required for connection establishment.

According to current development of the Third generation partnership project (3GPP) specifications for 5G technology, it is proposed to reuse the 4G design of user plane Cellular Internet of Things (CIoT) optimizations in 5G systems to realize Small Data Transmission (SDT) in the inactive state. FIG. 1 is a message sequence chart illustrating an example of SDT procedure in 5G systems. As shown in FIG. 1, a UE in the inactive state may initiate the resume procedure by transmitting an RRCResumeRequest message with Uplink (UL) data (or called small data) to the serving cell. If relocation of the anchor gNB occurs, the serving cell may have to fetch the UE's context from the anchor gNB and perform a path switching procedure. After that, the serving cell transmits a request for UE context release to the anchor gNB and then forwards the UL data to the core network. Subsequently, the serving cell waits for possible Downlink (DL) data from the core network and transmits the DL data to the UE. When there is no more DL data for the UE, the serving cell may transmit an RRCRelease message to the UE. In response to the RRCRelease message, the UE terminates the SDT procedure. However, it should be noted that the serving cell may spend an unpredictable amount of time to respond to the RRCResumeRequest with small data. Meanwhile, the UE in the inactive state will continue to perform cell reselection measurements after transmitting the RRCResumeRequest message with small data. As a result, the possibility of cell reselection occurring during the SDT procedure would be rather high, and if this occurs, the UE will have to enter the idle state and leave the SDT procedure uncompleted. Once the UE enter the idle state, it will cause additional power consumption and signaling overhead to retransmit the small data.

Therefore, it is desirable to have a robust way of transmitting small data in the inactive state.

BRIEF SUMMARY OF THE APPLICATION

In one aspect of the application, a method executed by a User Equipment (UE) communicatively connected to a mobile communication network is provided. The method comprises the steps of: operating in a Radio Resource Control (RRC) inactive state as configured by the mobile communication network; in response to a Small Data Transmission (SDT) procedure being triggered in the RRC inactive state, monitoring a signal quality of a serving cell of the mobile communication network or determining a traffic type of data to be transmitted in the SDT procedure; and determining whether to perform the SDT procedure based on the signal quality of the serving cell or the traffic type of the data.

In another aspect of the application, a UE comprising a wireless transceiver and a controller is provided. The wireless transceiver is configure to perform wireless transmission and reception to and from a mobile communication network. The controller is configured to perform the following via the wireless transceiver: operating in an RRC inactive state as configured by the mobile communication network; in response to a SDT procedure being triggered in the RRC inactive state, monitoring a signal quality of a serving cell of the mobile communication network or determining a traffic type of data to be transmitted in the SDT procedure;

and determining whether to perform the SDT procedure based on the signal quality of the serving cell or the traffic type of the data.

In yet another aspect of the application, a method executed by a UE communicatively connected to a mobile communication network is provided. The method comprises the steps of: operating in an RRC inactive state as configured by the mobile communication network; performing a SDT procedure in the RRC inactive state by transmitting data to the mobile communication network; and during the SDT procedure, monitoring a signal quality of a serving cell of the mobile communication network and reporting the signal quality of the serving cell to the mobile communication device.

Other aspects and features of the present application will become apparent to those with ordinarily skill in the art upon review of the following descriptions of specific embodiments of the apparatuses and methods for SDT in an RRC inactive state.

BRIEF DESCRIPTION OF THE DRAWINGS

The present application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Figure 1:
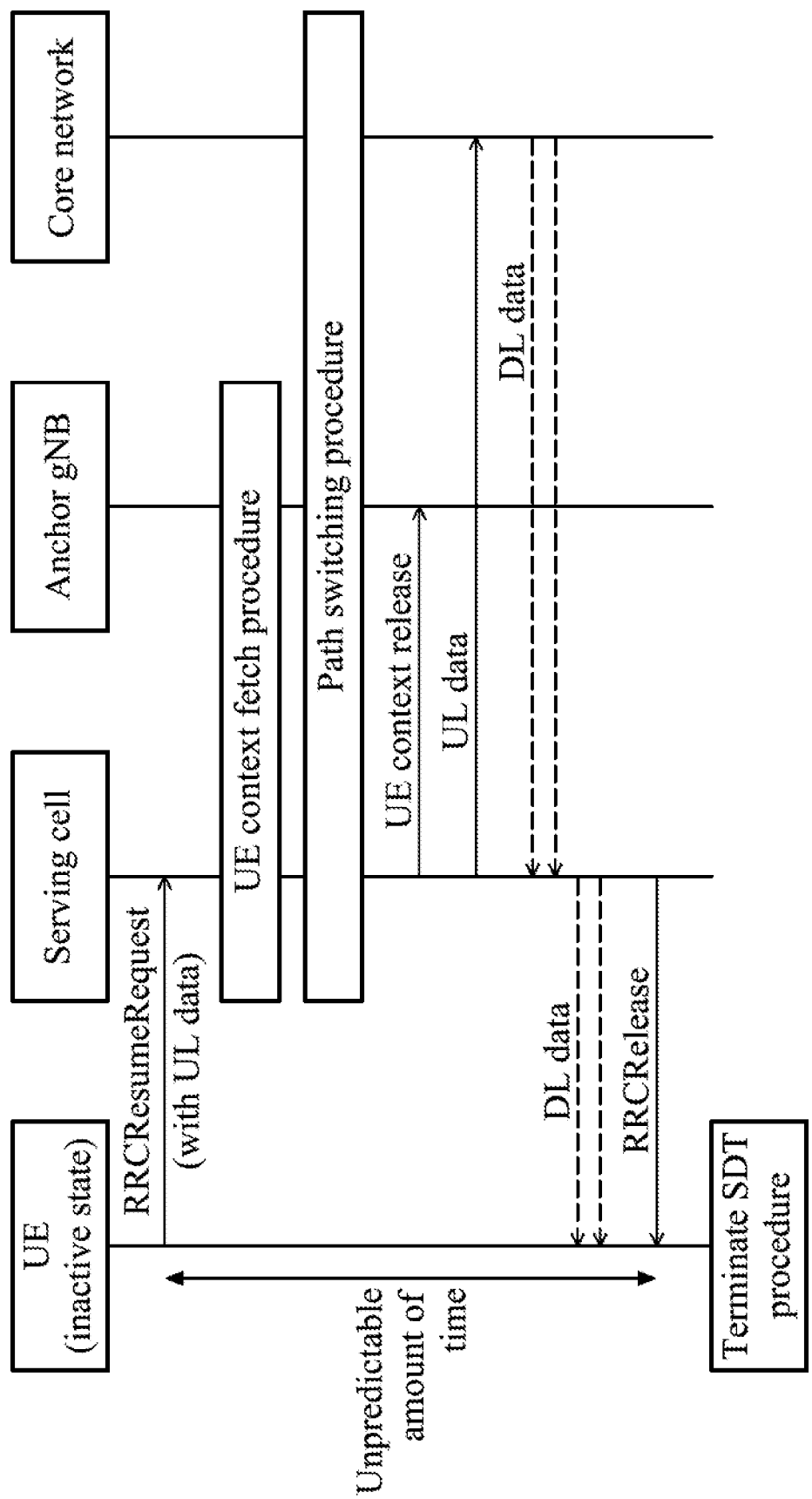
FIG. 1 is a message sequence chart illustrating an example of SDT procedure in 5G systems.
Figure 2:
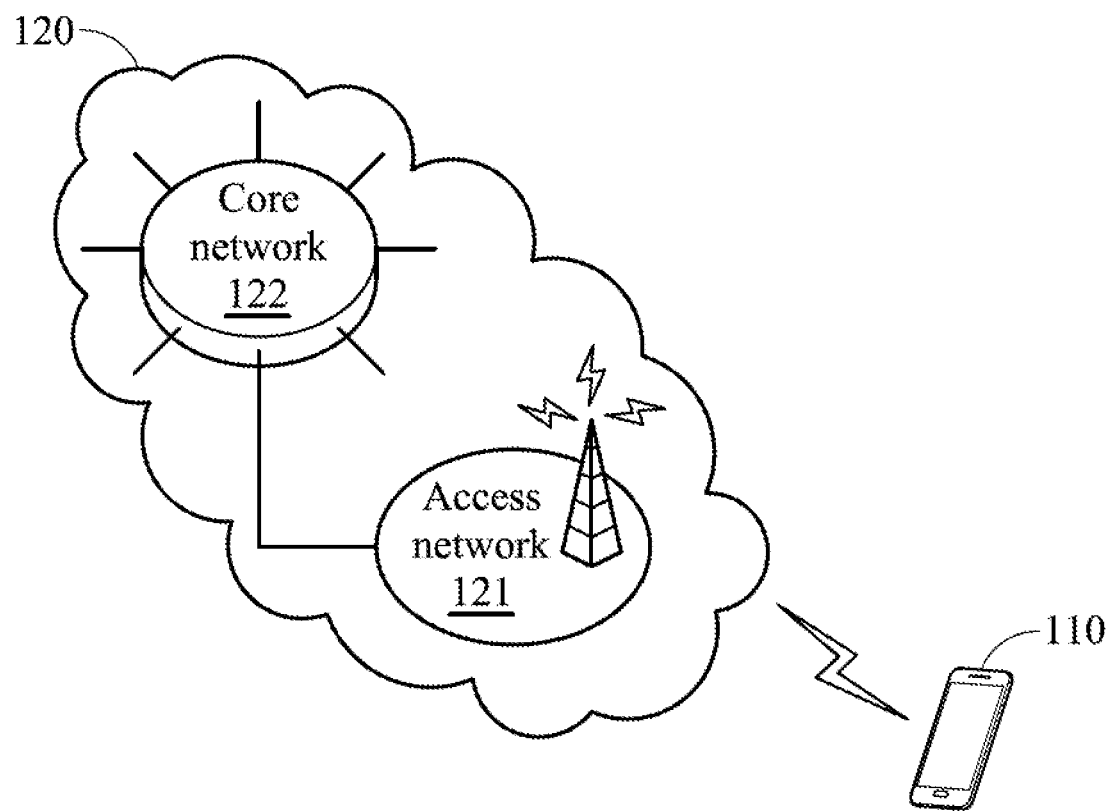
FIG. 2 is a block diagram of a mobile communication environment according to an embodiment of the application.

FIG. 2 is a block diagram of a mobile communication environment according to an embodiment of the application.

As shown in FIG. 2, the mobile communication environment 100 includes a User Equipment (UE) 110 and a mobile communication network 120.

The UE 110 may be a feature phone, a smartphone, a panel Personal Computer (PC), a laptop computer, a Machine Type Communication (MTC) device, or any mobile communication device supporting the RATs utilized by the mobile communication network 120. The UE 110 may connect to the mobile communication network 120 to obtain mobile services (e.g., voice and/or data services).

The mobile communication network 120 may include an access network 121 and a core network 122. The access network 121 is responsible for processing radio signals, terminating radio protocols, and connecting the UE 110 with the core network 122, while the core network 122 is responsible for performing mobility management, network-side authentication, and interfaces with public/external networks (e.g., the Internet).

In one embodiment, the mobile communication network 120 is a 5G network (e.g., an NR network), and the access network 121 and the core network 122 may be a Next Generation Radio Access Network (NG-RAN) and a Next Generation Core Network (NG-CN), respectively. The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

In accordance with one novel aspect, the UE 110 takes the signal quality of the serving cell and the traffic type of the small data to be transmitted into consideration before or during the SDT procedure, so as to reduce the possibility of cell reselection occurring during the SDT procedure. Specifically, several approaches are proposed, each of which may realize a robust way of small data transmissions for UEs operating in the RRC inactive state. In approach 1-1, the UE 110 may determine whether to perform the SDT procedure based on the signal quality of the serving cell (e.g., whether the signal quality of the serving cell is higher than a first threshold). In approach 1-2, the UE 110 may report the signal quality of the serving cell to the mobile communication network 120 during the SDT procedure, to assist the mobile communication network 120 with the determination of whether to terminate the SDT procedure as soon as possible. In approach 2-1, the UE 110 may check if the condition for UE terminating SDT is satisfied (e.g., whether the signal quality of the serving cell is lower than a second threshold, and/or whether the traffic type of the small data not requiring the UE to wait for a response RRC message), and if so, use a random access preamble reserved for SDT to request small data transmission and terminate the SDT procedure without waiting for a response RRC message. In approach 2-2, the UE 110 may check if the condition for UE terminating SDT is satisfied, and if so, transmit the small data with an indicator of UE terminating SDT and terminate the SDT procedure without waiting for a response RRC message. In approach 3, the UE 110 may apply the combination of approach 1-1/1-2 and approach 2-1/2-2.

Figure 3:
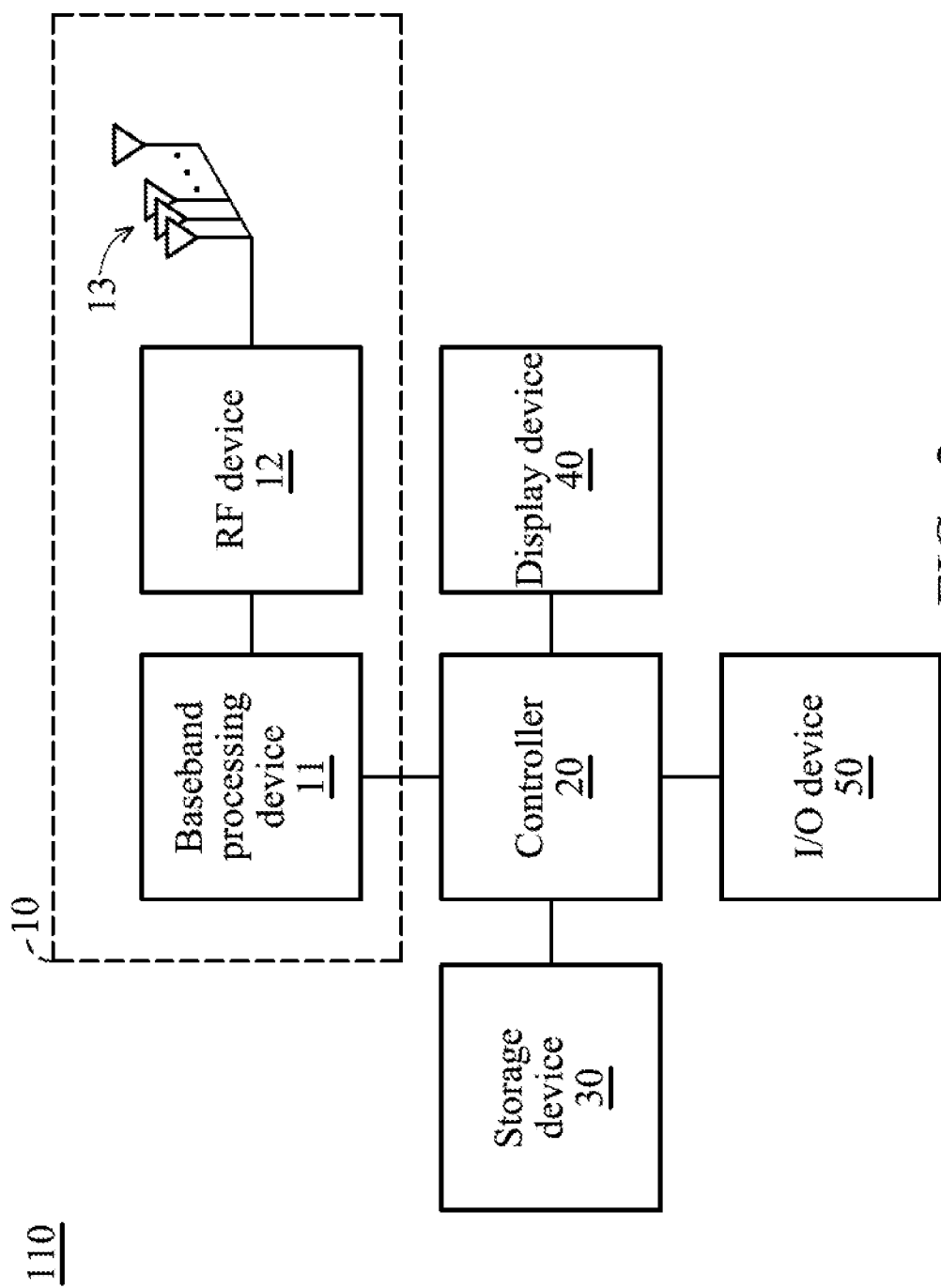
FIG. 3 is a block diagram illustrating the UE 110 according to an embodiment of the application.

FIG. 3 is a block diagram illustrating the UE 110 according to an embodiment of the application.

As shown in FIG. 3, the UE 110 may include a wireless transceiver 10, a controller 20, a storage device 30, a display device 40, and an Input/Output (I/O) device 50.

The wireless transceiver 10 is configured to perform wireless transmission and reception to and from the mobile communication network 120. Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (e.g., one or more SIMS) and/or one or more Universal SIMs (USIMs)) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 900 MHz, 2100 MHz, or 2.6 GHz utilized in 4G (e.g., LTE/LTE-A/TD-LTE) systems, or may be any radio frequency (e.g., 30 GHz-300 GHz for mmWave, or 3.3 GHz-4.9 GHz for sub-6) utilized in 5G (e.g., NR) systems, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless transceiving with the mobile communication network 120, enabling the storage device 30 for storing and retrieving data, sending a series of frame data (e.g. representing text messages, graphics, images, etc.) to the display device 40, and receiving/outputting signals from/to the I/O device 50.

In particular, the controller 20 coordinates the aforementioned operations of the wireless transceiver 10, the storage device 30, the display device 40, and the I/O device 50 for performing the method for SDT in the RRC inactive state.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory computer-readable storage medium, including a Universal Integrated Circuit Card (UICC) (e.g., a Subscriber Identity Module (SIM) or Universal SIM (USIM) card), a memory (e.g., a FLASH memory or a Non-Volatile Random Access Memory (NVRAM)), a magnetic storage device (e.g., a hard disk or a magnetic tape), or an optical disc, or any combination thereof for storing data, instructions, and/or program code of applications, communication protocols, and/or the method of the present application.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 3 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications. Alternatively, the UE 110 may include fewer components. For example, the UE 110 may not include the display device 40 and/or the I/O device 50.

Figure 4:
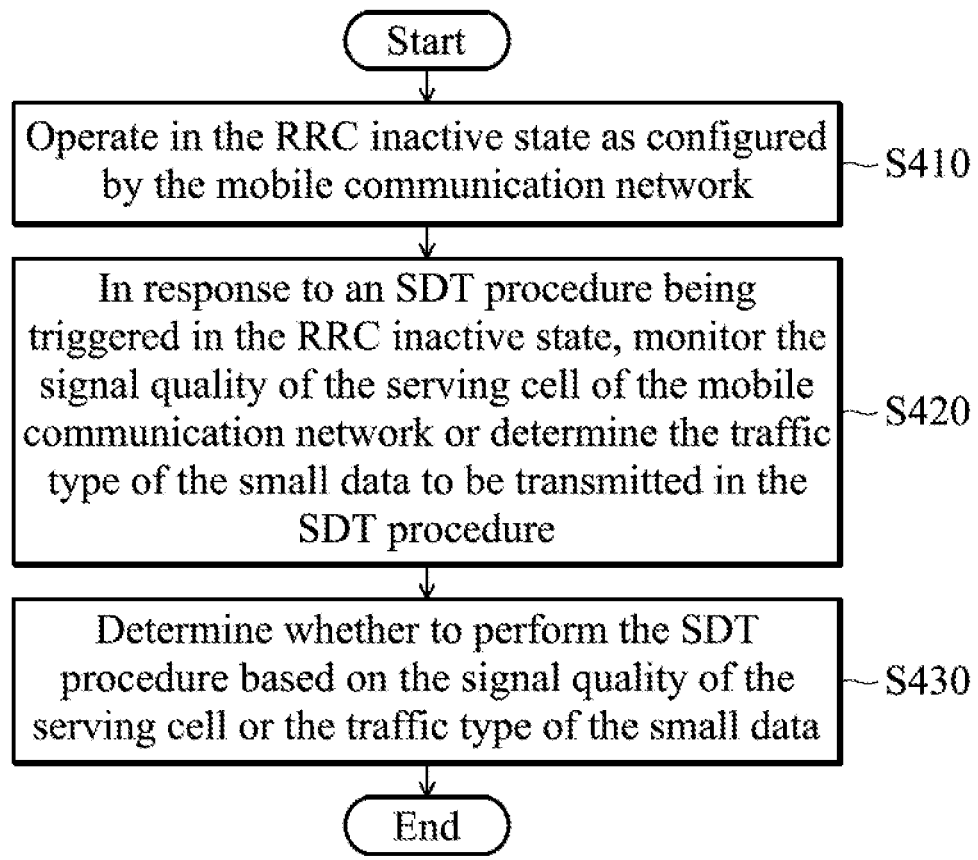
FIG. 4 is a flow chart illustrating the method for SDT in the RRC inactive state according to an embodiment of the application.

FIG. 4 is a flow chart illustrating the method for SDT in the RRC inactive state according to an embodiment of the application.

In this embodiment, the method is applied to and executed by a UE (e.g., the UE 110) communicatively connected to a mobile communication network (e.g., the mobile communication network 120), and the method corresponds to approach 1-1 and/or approach 2.

To begin, the UE operates in the RRC inactive state as configured by the mobile communication network (step S410). In one embodiment, the UE may enter the RRC inactive state from the RRC connected state according to the "suspendConfig" Information Element (IE) in an RRCRelease message received from the serving cell, wherein the "suspendConfig" IE includes the configuration for the UE to operate in the RRC inactive state.

Next, in response to an SDT procedure being triggered in the RRC inactive state, the UE monitors the signal quality of the serving cell of the mobile communication network or determines the traffic type of the small data to be transmitted in the SDT procedure (step S420).

After that, the UE determines whether to perform the SDT procedure based on the signal quality of the serving cell or the traffic type of the small data (step S430).

Figure 5:
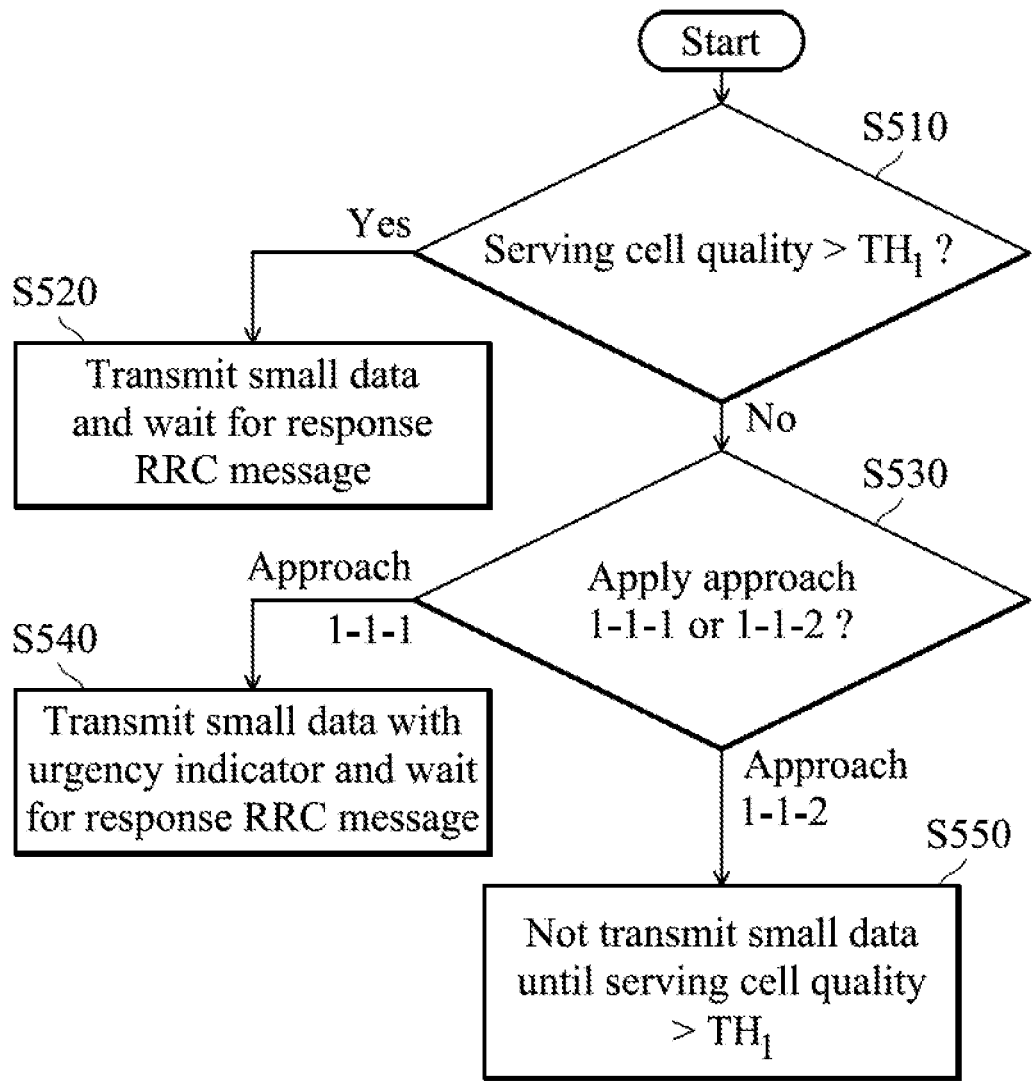
FIG. 5 is a flow chart illustrating the UE behaviors with respect to the determination result of step S430 according to an embodiment of the application.

FIG. 5 is a flow chart illustrating the UE behaviors with respect to the determination result of step S430 according to an embodiment of the application.

In step S510, the UE determines whether the signal quality of the serving cell is higher than a first threshold. In one embodiment, the first threshold is configured in Reference Signal Information (RSI) received from the serving cell. For example, the RSI is included in the SDT configuration received in an RRC message or a broadcast message, wherein the SDT configuration also includes the SDT resource information, such as the Random Access Channel (RACH) resource information for RA-SDT or the Configured Grant (CG) resource information for CG-SDT.

Subsequent to step S510, if the signal quality of the serving cell is higher than the first threshold, the method proceeds to step S520. Otherwise, if the signal quality of the serving cell is not higher than the first threshold, the method proceeds to step S530.

In step S520, the UE transmits the small data via the SDT procedure (e.g., in an RRCResumeRequest message) and waits for a response RRC message (e.g., an RRCRelease message) before terminating the SDT procedure.

In step S530, the UE determines whether to apply approach 1-1-1 or 1-1-2.

Subsequent to step S530, if the UE determines to apply approach 1-1-1, the method proceeds to step S540. Otherwise, if the UE determines to apply approach 1-1-2, the method proceeds to step S550.

In step S540, the UE transmits the small data with an urgency indicator to the serving cell via the SDT procedure, and waits for a response RRC message before terminating the SDT procedure. The urgency indicator may indicate that the signal quality of the serving cell is lower than or equal to a first threshold (which may be interpreted as: a cell reselection is likely to occur). The details of step S540 will be described later in FIG. 6.

In step S550, the UE does not transmit the small data via the SDT procedure until the signal quality of the serving cell is higher than the first threshold. That is, the UE refrains from performing the SDT procedure till the signal quality of the serving cell is higher than the first threshold.

Figure 6:
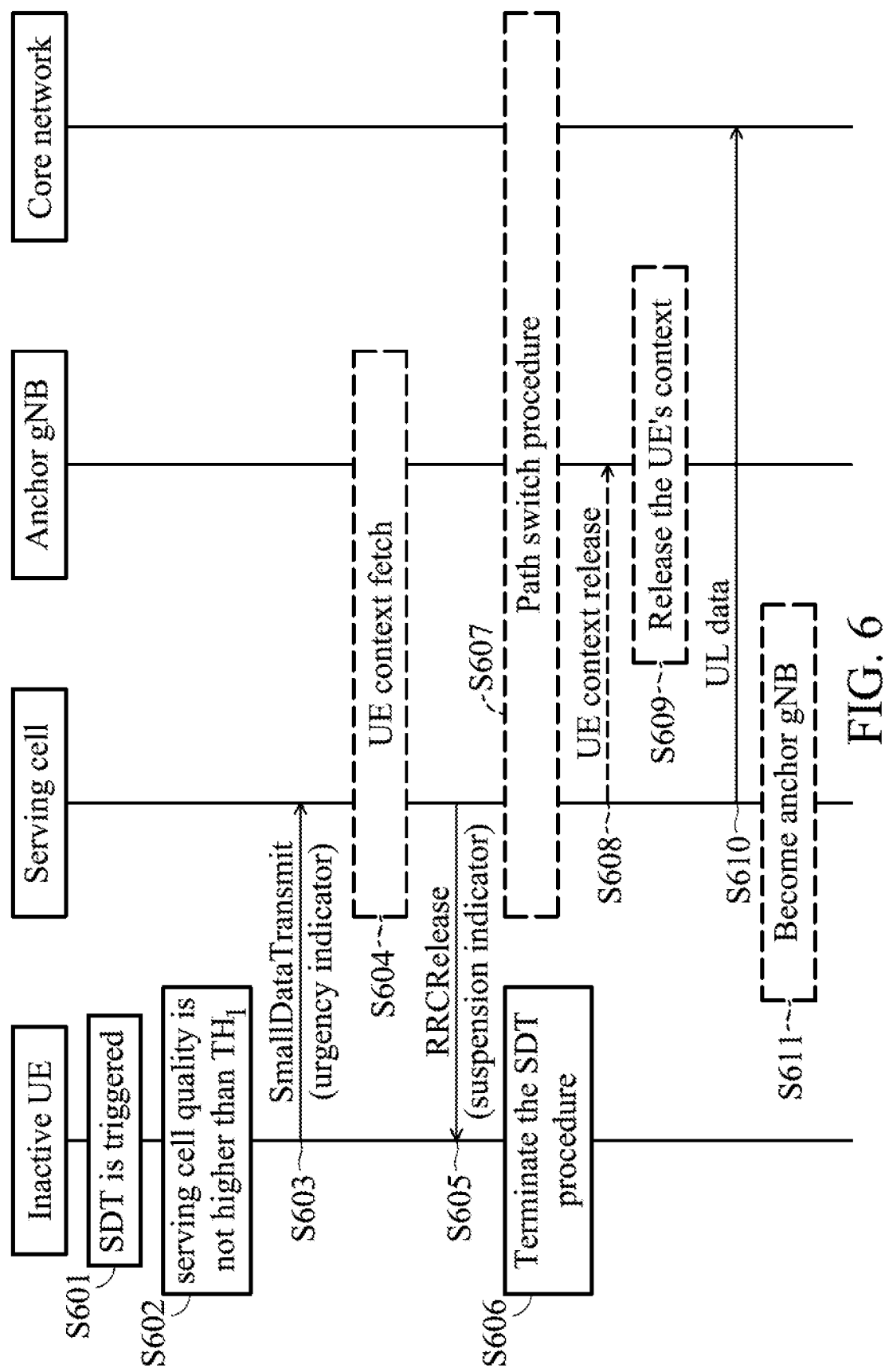
FIG. 6 is a message sequence chart illustrating the SDT procedure in approach 1-1-1 according to an embodiment of the application.

FIG. 6 is a message sequence chart illustrating the SDT procedure in approach 1-1-1 according to an embodiment of the application.

In step S601, an SDT procedure is triggered when the UE is operating in the RRC inactive state.

In step S602, the UE determines that the signal quality of the serving cell of the mobile communication network is not higher than the first threshold.

In step S603, the UE transmits the small data with an urgency indicator to the serving cell via the SDT procedure. The small data may be transmitted in an RRCResumeRequest message or any RRC message which at least includes a resume Identifier (ID), a resume Message Authentication Code-Integrity (MAC-I), and a resume cause.

In step S604, the serving cell fetches the UE's context from the anchor gNB.

In step S605, the serving cell transmits an RRCRelease message and a suspension indicator to the UE. The suspension indicator may refer to the "suspendConfig" IE in the RRCRelease message, which includes the (updated) configuration for the UE to operate in the RRC inactive state.

In step S606, the UE terminates the SDT procedure and updates the configuration of the RRC inactive state (if necessary).

In step S607, the serving cell performs a path switching procedure.

In step S608, the serving cell transmits a request for UE context release to the anchor gNB.

In step S609, the anchor gNB releases the UE's context.

In step S610, the serving cell forwards the UL data to the core network.

In step S611, the serving cell becomes the new anchor gNB.

Please note that if relocation of the anchor gNB does not occur, steps S604, S607~S609, and S611 may be omitted and step S610 should be replaced with UL data forwarding from the serving cell to the anchor gNB first and then from the anchor gNB to the core network.

Figure 7:
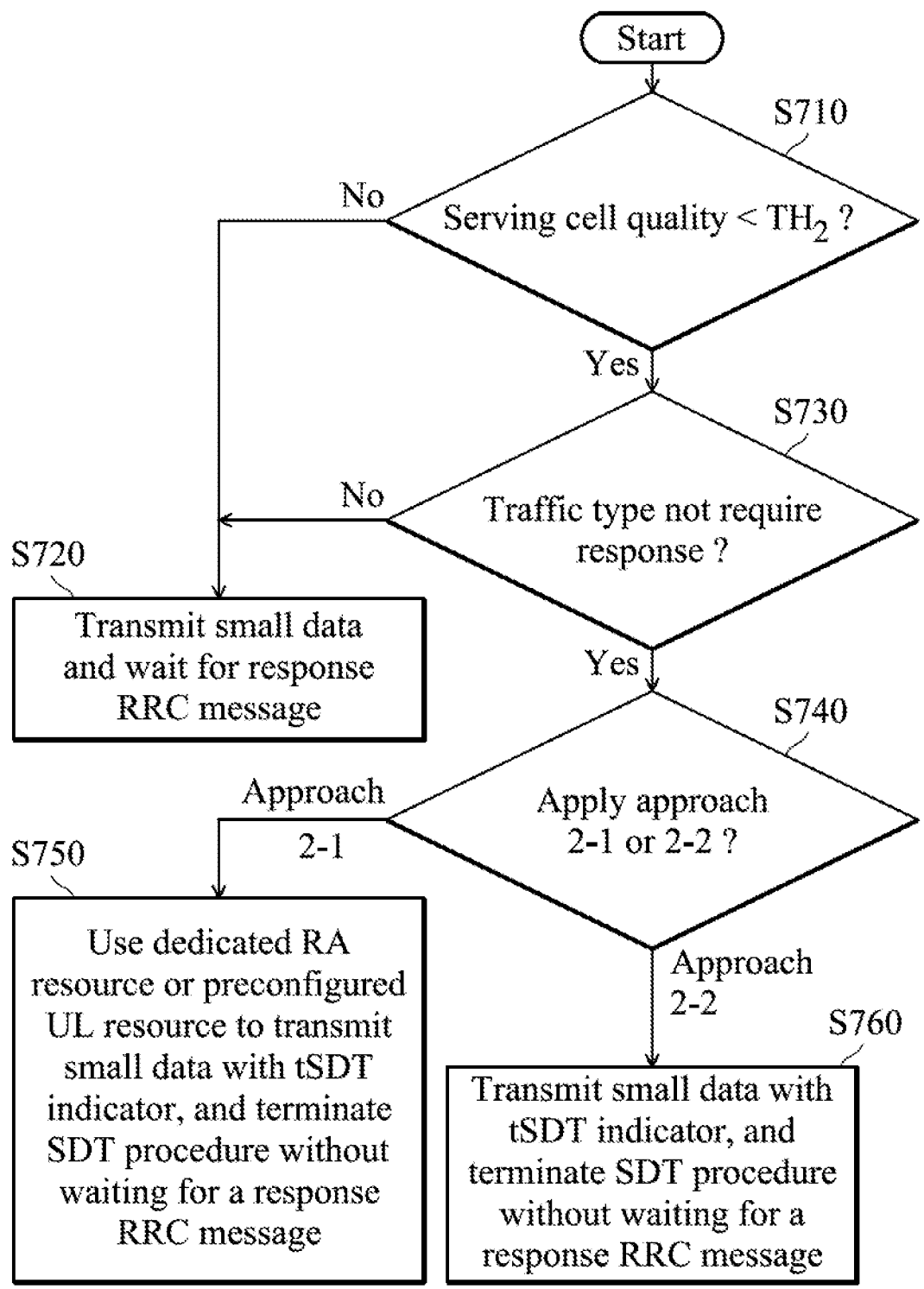
FIG. 7 is a flow chart illustrating the UE behaviors with respect to the determination result of step S430 according to another embodiment of the application.

FIG. 7 is a flow chart illustrating the UE behaviors with respect to the determination result of step S430 according to another embodiment of the application.

In step S710, the UE checks if the first condition for UE terminating SDT is satisfied, i.e., the UE determines whether the signal quality of the serving cell is lower than a second threshold. In one embodiment, the second threshold is configured in an RSI received from the serving cell. For example, the RSI is included in the SDT configuration received in an RRC message or a broadcast message, wherein the SDT configuration also includes the SDT resource information, such as the RACH resource information for RA-SDT or the CG resource information for CG-SDT.

Subsequent to step S710, if the signal quality of the serving cell is not lower than the second threshold, the method proceeds to step S720. Otherwise, if the signal quality of the serving cell is lower than the first threshold, the method proceeds to step S730.

In step S720, the UE transmits the small data via the SDT procedure (e.g., in an RRCResumeRequest message) and waits for a response RRC message (e.g., an RRCRelease message) before terminating the SDT procedure.

In step S730, the UE checks if the second condition for UE terminating SDT is satisfied, i.e., the UE determines whether the traffic type of the small data does not require the UE to wait for a response RRC message.

Subsequent to step S730, if the traffic type of the small data requires the UE to wait for a response RRC message, the method returns to step S720. Otherwise, if the traffic type of the small data does not require the UE to wait for a response RRC message, the method proceeds to step S740.

In step S740, the UE determines whether to apply approach 2-1 or 2-2.

Subsequent to step S740, if the UE determines to apply approach 2-1, the method proceeds to step S750. Otherwise, if the UE determines to apply approach 2-2, the method proceeds to step S760.

In step S750, the UE may use a random access preamble reserved for SDT to request small data transmission with an indicator of UE terminating SDT (referred to herein as a tSDT indicator for brevity) or use preconfigured UL resource for small data transmission with a tSDT indicator, and after transmitting the small data, terminates the SDT procedure without waiting for a response RRC message. The details of step S750 will be described later in FIG. 8.

In step S760, the UE transmits the small data with a tSDT indicator, and then terminates the SDT procedure without waiting for a response RRC message. The details of step S540 will be described later in FIG. 9.

In another embodiment, step S740 may be performed only when both the first and second conditions for UE terminating SDT are satisfied.

Figure 8:
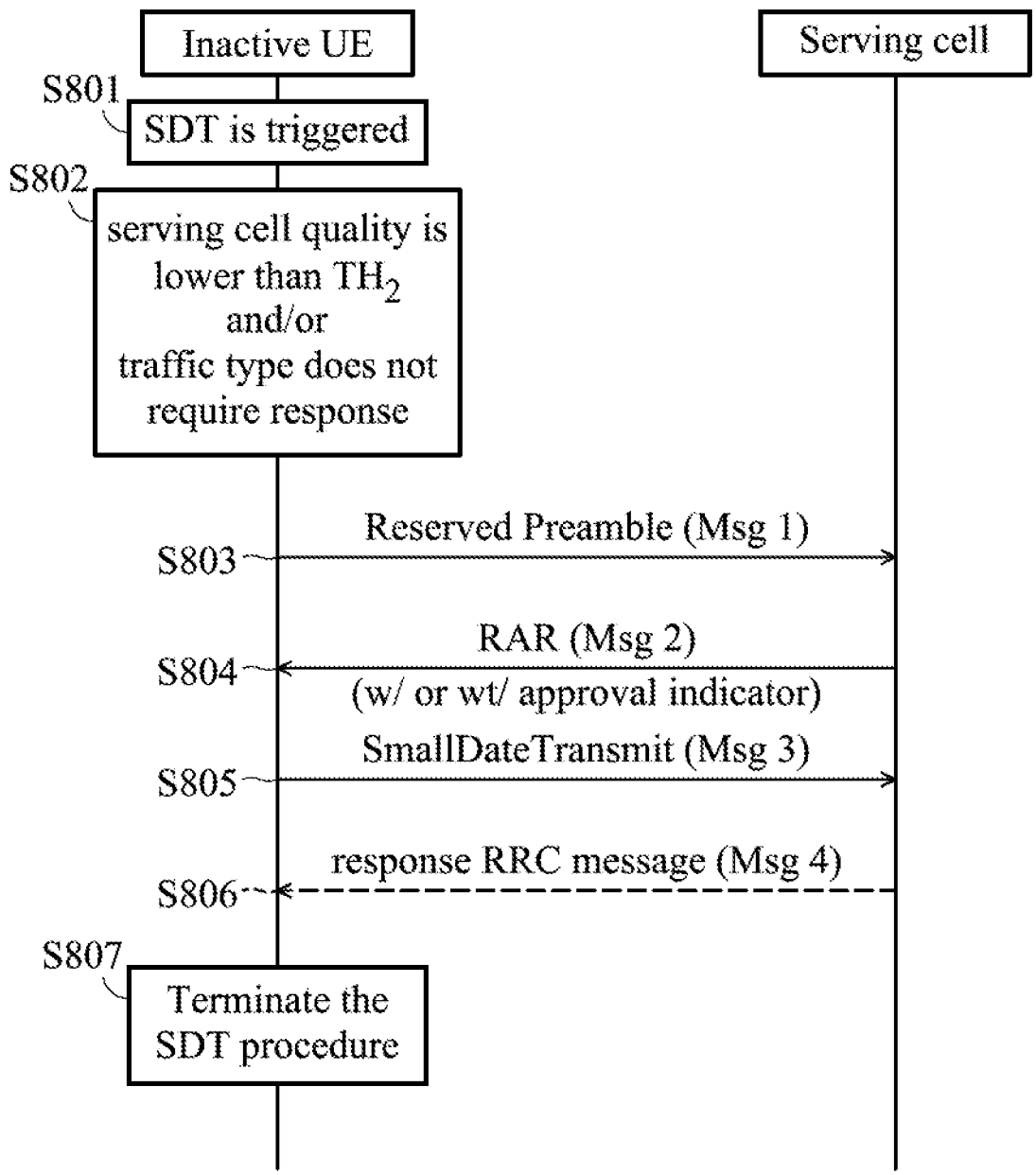
FIG. 8 is a message sequence chart illustrating the SDT procedure in approach 2-1 according to an embodiment of the application.

FIG. 8 is a message sequence chart illustrating the SDT procedure in approach 2-1 according to an embodiment of the application.

In step S801, an SDT procedure is triggered when the UE is operating in the RRC inactive state.

In step S802, the UE determines that the signal quality of the serving cell is lower than the second threshold and/or the traffic type of the small data does not require the UE to wait for a response RRC message.

In step S803, the UE transmits a random access preamble reserved for UE terminating SDT.

In step S804, the UE receives a random access response which may or may not include an approval indicator. The approval indicator is used to indicate that the serving cell approves the UE to terminate the SDT procedure without waiting for the response RRC message.

In step S805, the UE transmits the small data to the serving cell. The small data may be transmitted in an RRCResumeRequest message or any RRC message which at least includes a resume ID) a resume MAC-I) and a resume cause.

In step S806, if the random access response does not include an approval indicator, the UE should wait for a response RRC message from the serving cell.

In step S807, if the random access response includes an approval indicator or a response RRC message is received, the UE terminates the SDT procedure.

Figure 9:
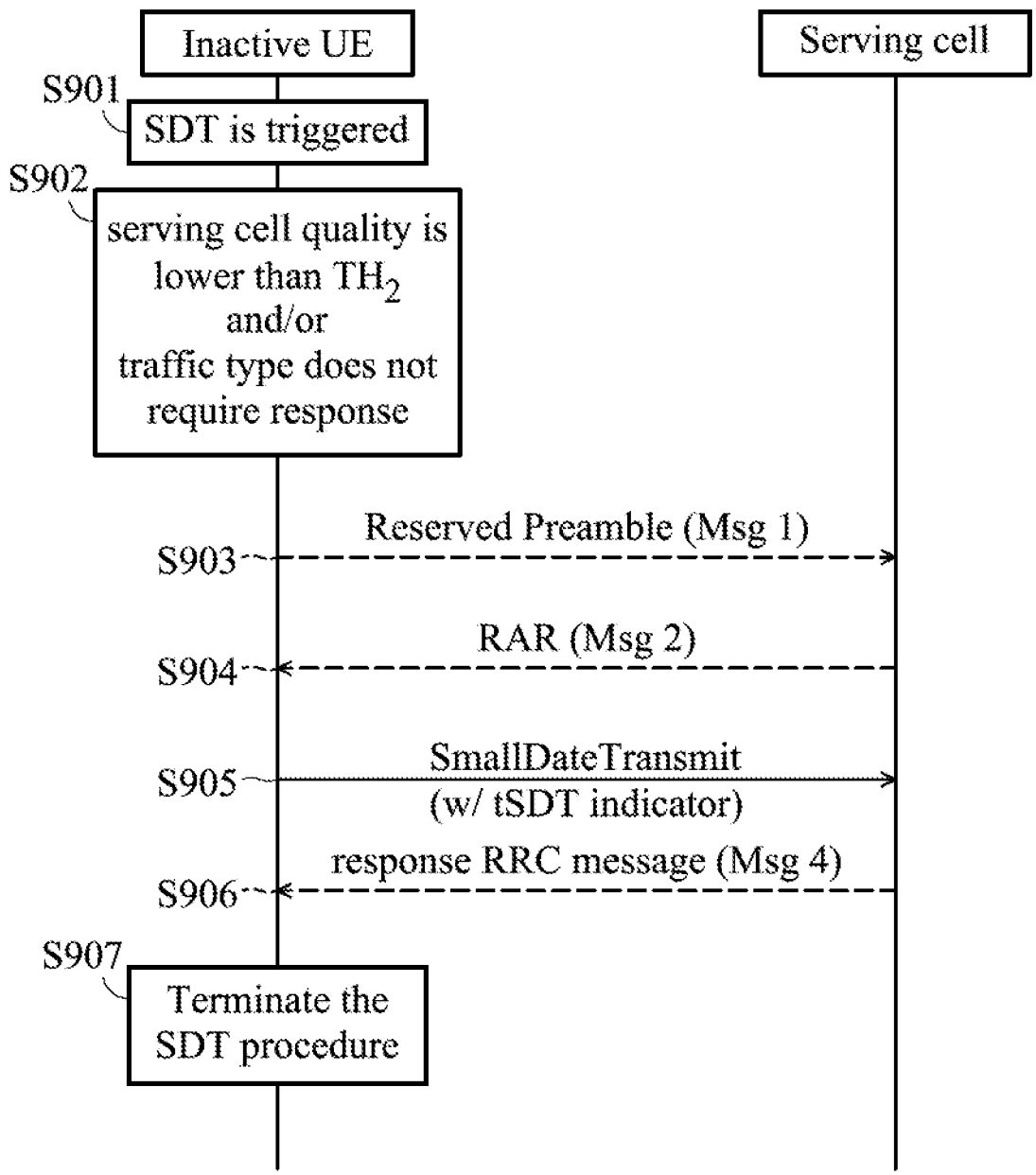
FIG. 9 is a message sequence chart illustrating the SDT procedure in approach 2-2 according to an embodiment of the application.

FIG. 9 is a message sequence chart illustrating the SDT procedure in approach 2-2 according to an embodiment of the application.

In step S901, an SDT procedure is triggered when the UE is operating in the RRC inactive state.

In step S902, the UE determines that the signal quality of the serving cell is lower than the second threshold and/or the traffic type of the small data does not require the UE to wait for a response RRC message.

In step S903, if the RA-SDT scheme is employed, the UE transmits a random access preamble reserved for SDT. Otherwise, if the CG-SDT scheme is employed, then step S903 may be omitted.

In step S904, if the RA-SDT scheme is employed, the UE receives a random access response which may or may not include an approval indicator. Otherwise, if the CG-SDT scheme is employed, then step S904 may be omitted. The approval indicator is used to indicate that the serving cell approves the UE to terminate the SDT procedure without waiting for the response RRC message.

In step S905, the UE transmits the small data with an indicator of UE terminating SDT (referred to herein as tSDT indicator for brevity) to the serving cell, wherein the tSDT indicator is used to inform the serving cell of that the UE will terminate the SDT procedure after transmitting the small data. The small data and the tSDT indicator may be transmitted in an RRCResumeRequest message or any RRC message which at least includes a resume ID, a resume MAC-I, and a resume cause. If the RA-SDT scheme is employed, the small data is transmitted using the RACH resources indicated by the random access response received in step S904. Otherwise, if the CG-SDT scheme is employed, the small data is transmitted using the pre-configured CG resources.

In step S906, if the RA-SDT scheme is employed, the UE should wait for a response RRC message from the serving cell. Otherwise, if the CG-SDT scheme is employed, then step S906 may be omitted.

In step S907, the UE terminates the SDT procedure.

Figure 10:
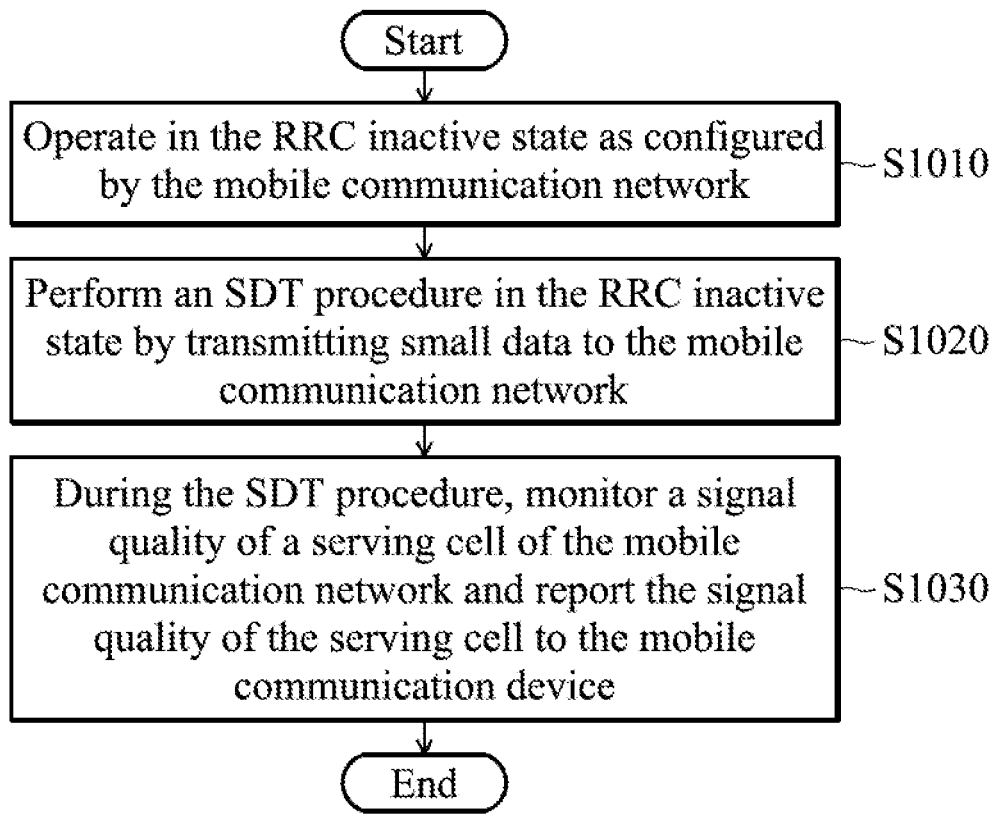
FIG. 10 is a flow chart illustrating the method for SDT in the RRC inactive state according to another embodiment of the application.

FIG. 10 is a flow chart illustrating the method for SDT in the RRC inactive state according to another embodiment of the application.

In this embodiment, the method is applied to and executed by a UE (e.g., the UE 110) communicatively connected to a mobile communication network (e.g., the mobile communication network 120), and the method corresponds to approach 1-2.

To begin, the UE operates in the RRC inactive state as configured by the mobile communication network (step S1010). In one embodiment, the UE may enter the RRC inactive state from the RRC connected state according to the "suspendConfig" IE in an RRCRelease message received from the serving cell, wherein the "suspendConfig" IE includes the configuration for the UE to operate in the RRC inactive state.

Next, the UE performs the SDT procedure in the RRC inactive state by transmitting small data to the mobile communication network (step S1020).

After that, during the SDT procedure, the UE monitors a signal quality of a serving cell of the mobile communication network and reports the signal quality of the serving cell to the mobile communication device. (step S1030).

In one embodiment, the signal quality of the serving cell is reported as a signal level corresponding to a value range, the signal level is determined based on mappings of signal levels to value ranges, and the mappings are configured in Reference Signal Information (RSI) received from the serving cell or are pre-defined in a Third generation partnership project (3GPP) specification. For example, the mappings may be provided as a signal level mapping table as shown below.

TABLE 1

| Signal quality of serving cell (dBm) | Signal level |
|---|---|
| Rx > −65 | Level 1 (Good) |
| −95 < Rx ≤ −65 | Level 2 (Normal) |
| −105 < Rx ≤ −95 | Level 3 (Bad) |

Once the UE triggers SDT procedure, it may report the signal level of the serving cell to assist the serving cell with the determination of whether to terminate the SDT procedure. In one embodiment, if the reported signal level is level 3, the serving cell may terminate the SDT procedure as soon as possible to prevent the cell reselection procedure from occurring in the UE. In other words, the serving cell may transmits an RRCRelease message to the UE in response to receiving the reported signal quality of the serving cell from the UE, and the UE may terminate the SDT procedure when receiving the RRCRelease message.

In one embodiment, the UE may report the signal quality of the serving cell along with each UL data transmission. In another embodiment, the UE may report the signal quality of the serving cell when the signal level of the signal quality is different from that of the last reported signal quality. In yet another embodiment, the UE may report the signal quality of the serving cell when the signal quality of the serving cell is associated with a predetermined signal level (e.g., level 3 in table 1).

Figure 11:
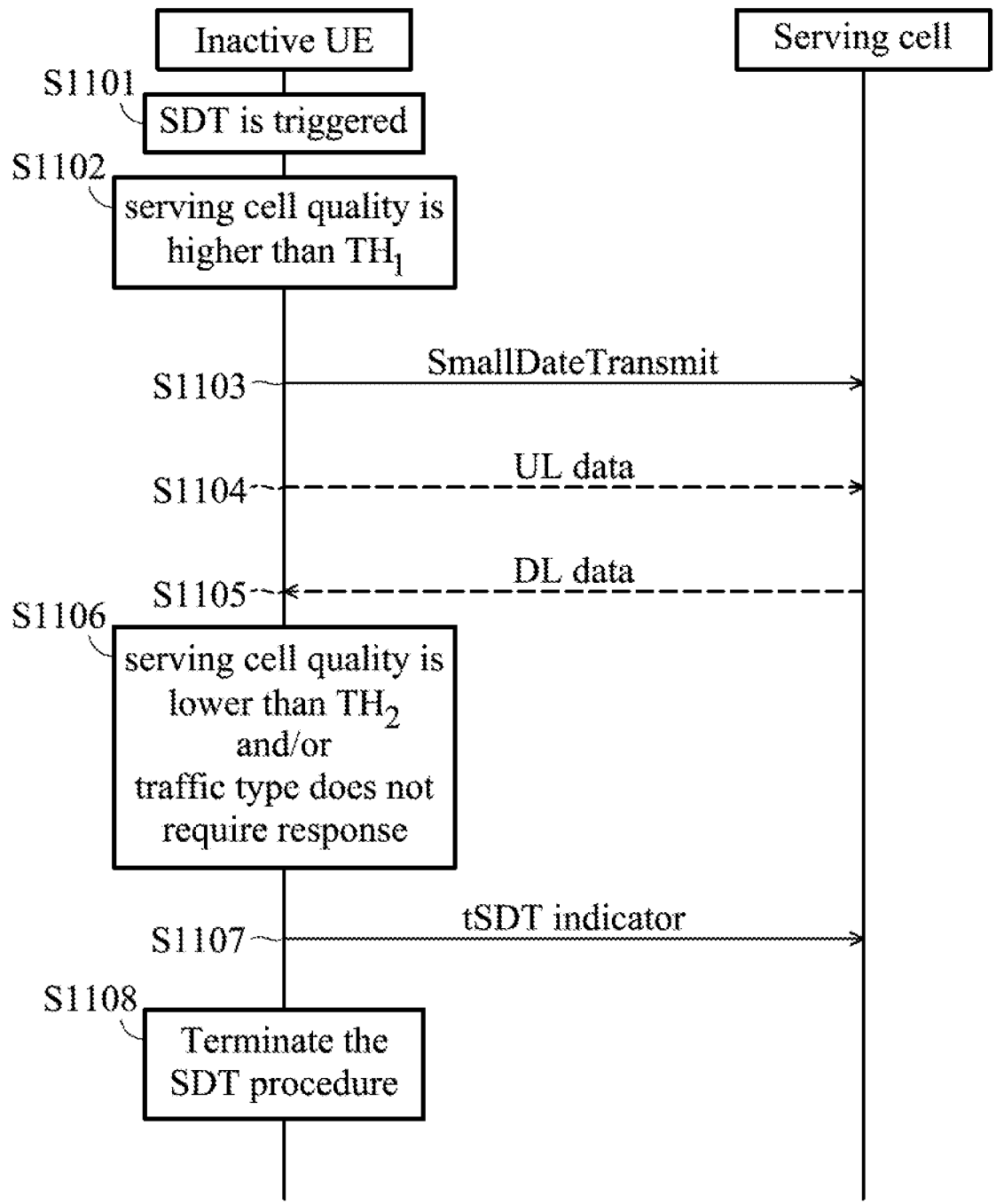
FIG. 11 is a message sequence chart illustrating the SDT procedure in approach 3-1 according to an embodiment of the application.

FIG. 11 is a message sequence chart illustrating the SDT procedure in approach 3-1 according to an embodiment of the application. In this embodiment, approach 3-1 is implemented by applying the combination of approach 1-1 and approach 2-2.

In step S1101, an SDT procedure is triggered when the UE is operating in the RRC inactive state.

In step S1102, the UE determines that the signal quality of the serving cell is higher than the first threshold.

In step S1103, the UE transmits the small data to the serving cell. The small data may be transmitted in an RRCResumeRequest message or any RRC message which at least includes a resume ID, a resume MAC-I, and a resume cause.

In steps S1104~S1105, the UE may transmit multiple UL and DL packets as part of the same SDT procedure, if required.

In step S1106, the UE determines that the condition for UE terminating SDT is satisfied (e.g., whether the signal quality of the serving cell is lower than the second threshold, and/or whether the traffic type of the small data not requiring the UE to wait for a response RRC message). Specifically, the first threshold is greater than the second threshold.

In step S1107, the UE transmits a tSDT indicator to the serving cell. The tSDT indicator may be transmitted with new UL data or may be transmitted alone in an RRCResumeRequest message or any RRC message which at least includes a resume ID, a resume MAC-I, and a resume cause.

In step S1108, the UE terminates the SDT procedure after transmitting the tSDT indicator.

Figure 12:
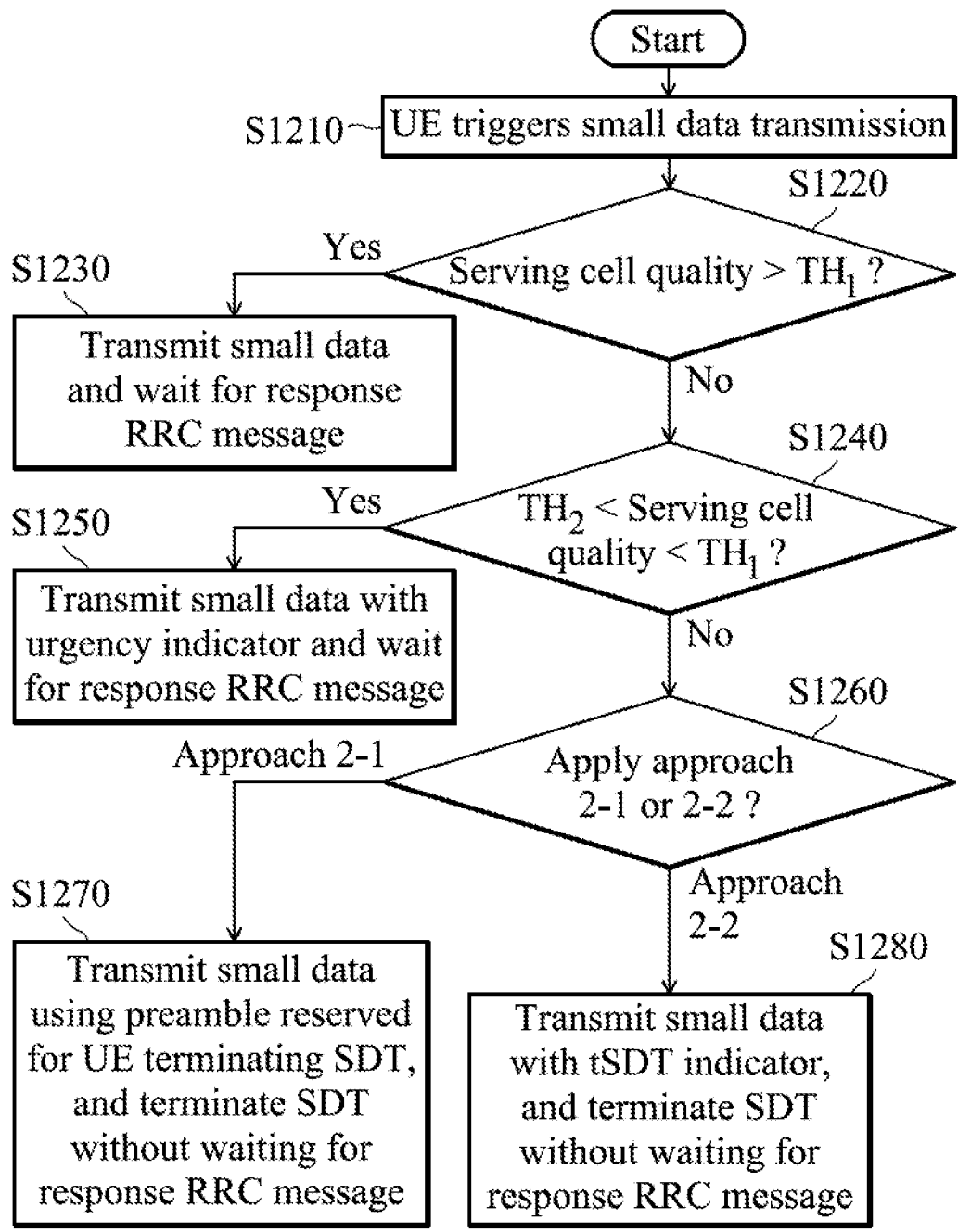
FIG. 12 is a flow chart illustrating the UE behaviors with respect to the SDT procedure in approach 3-2 according to an embodiment of the application.

FIG. 12 is a flow chart illustrating the UE behaviors with respect to the SDT procedure in approach 3-2 according to an embodiment of the application. In this embodiment, approach 3-2 is implemented by applying the combination of approach 1-1 and approach 2-1 or 2-2.

In step S1210, the UE triggers the SDT procedure when operating in the RRC inactive state.

In step S1220, the UE determines whether the signal quality of the serving cell is higher than the first threshold.

Subsequent to step S1220, if the signal quality of the serving cell is higher than the first threshold, the method proceeds to step S1230. Otherwise, if the signal quality of the serving cell is not higher than the first threshold, the method proceeds to step S1240.

In step S1230, the UE transmits the small data (e.g., in an RRCResumeRequest message) and waits for a response RRC message (e.g., an RRCRelease message) before terminating the SDT procedure.

In step S1240, the UE determines whether the signal quality of the serving cell is lower than the first threshold and is higher than the second threshold. Specifically, the first threshold is greater than the second threshold. In one embodiment, the first and second thresholds are configured in an RSI received from the serving cell. For example, the RSI is included in the SDT configuration received in an RRC message or a broadcast message, wherein the SDT configuration also includes the SDT resource information, such as the RACH resource information for RA-SDT or the CG resource information for CG-SDT.

Subsequent to step S1240, if the signal quality of the serving cell is lower than the first threshold and is higher than the second threshold, the method proceeds to step S1250. Otherwise, if the signal quality of the serving cell is lower than the second threshold, the method proceeds to step S1260.

In step S1250, the UE transmits the small data (e.g., in an RRCResumeRequest message) with an urgency indicator and waits for a response RRC message (e.g., an RRCRelease message) before terminating the SDT procedure.

In step S1260, the UE determines whether to apply approach 2-1 or 2-2.

Subsequent to step S1260, if the UE determines to apply approach 2-1, the method proceeds to step S1270. Otherwise, if the UE determines to apply approach 2-2, the method proceeds to step S1280.

In step S1270, the UE uses a random access preamble reserved for SDT to request small data transmission, and terminates the SDT procedure without waiting for a response RRC message.

In step S1280, the UE transmits the small data with a tSDT indicator and terminates the SDT procedure without waiting for a response RRC message.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method, executed by a User Equipment (UE) communicatively connected to a mobile communication network, the method comprising:
    operating in a Radio Resource Control (RRC) inactive state as configured by the mobile communication network;
    in response to a Small Data Transmission (SDT) procedure being triggered in the RRC inactive state, monitoring a signal quality of a serving cell of the mobile communication network and determining a traffic type of data to be transmitted in the SDT procedure; and
    determining whether to perform the SDT procedure based on the signal quality of the serving cell and the traffic type of the data.

2. The method as claimed in claim 1, further comprising:
    performing the SDT procedure by transmitting the data to the mobile communication network, in response to the signal quality being higher than a first threshold.

3. The method as claimed in claim 2, wherein the first threshold is configured in Reference Signal Information (RSI) received from the serving cell.

4. The method as claimed in claim 3, wherein the RSI is received in an RRC message or a broadcast message.

5. The method as claimed in claim 2, wherein the data is transmitted in an RRC message comprising a resume Identifier (ID), a resume Message Authentication Code-Integrity (MAC-I), and a resume cause.

6. The method as claimed in claim 5, wherein the RRC message is an RRCResumeRequest message.

7. The method as claimed in claim 1, further comprising:
performing the SDT procedure by transmitting the data to the mobile communication network, in response to the signal quality being lower than a second threshold and in response to the traffic type of the data not requiring the UE to wait for a response RRC message.

8. The method as claimed in claim 7, wherein the SDT procedure is performed by transmitting a random access preamble reserved for UE terminating SDT and receiving a random access response, and the method further comprises:
terminating the SDT procedure in response to transmitting the data and in response to the random access response comprising an indicator for approving the UE to terminate the SDT procedure without waiting for the response RRC message; or
waiting to receive the response RRC message in response to transmitting the data and in response to the random access response not comprising the indicator.

9. The method as claimed in claim 7, wherein the data is transmitted with an indicator of UE terminating SDT, and the method further comprises:
terminating the SDT procedure in response to transmitting the data with the indicator of UE terminating SDT.

10. A User Equipment (UE), comprising:
a wireless transceiver, configured to perform wireless transmission and reception to and from a mobile communication network; and
a controller, configured to perform the following via the wireless transceiver:
operating in a Radio Resource Control (RRC) inactive state as configured by the mobile communication network;
in response to a Small Data Transmission (SDT) procedure being triggered in the RRC inactive state, monitoring a signal quality of a serving cell of the mobile communication network and determining a traffic type of data to be transmitted in the SDT procedure; and
determining whether to perform the SDT procedure based on the signal quality of the serving cell and the traffic type of the data.

11. The UE as claimed in claim 10, wherein the controller is further configured to:
perform the SDT procedure by transmitting the data to the mobile communication network, in response to the signal quality being higher than a first threshold.

12. The UE as claimed in claim 10, wherein the controller is further configured to:
perform the SDT procedure by transmitting the data to the mobile communication network, in response to the signal quality being lower than a second threshold and in response to a traffic type of the data not requiring the UE to wait for a response RRC message.

13. The UE as claimed in claim 12, wherein the SDT procedure is performed by transmitting a random access preamble reserved for UE terminating SDT and receiving a random access response, and the controller is further configured to:
terminate the SDT procedure in response to transmitting the data and in response to the random access response comprising an indicator for approving the UE to terminate the SDT procedure without waiting for the response RRC message; or
wait to receive the response RRC message in response to transmitting the data and in response to the random access response not comprising the indicator.

14. The UE as claimed in claim 12, wherein the data is transmitted with an indicator of UE terminating SDT, and the controller is further configured to:
terminate the SDT procedure in response to transmitting the data with the indicator of UE terminating SDT.

15. A method, executed by a User Equipment (UE) communicatively connected to a mobile communication network, the method comprising:
operating in a Radio Resource Control (RRC) inactive state as configured by the mobile communication network;
performing a Small Data Transmission (SDT) procedure in the RRC inactive state by transmitting data to the mobile communication network; and
during the SDT procedure, monitoring a signal quality of a serving cell of the mobile communication network and reporting the signal quality of the serving cell to the mobile communication network,
wherein the signal quality of the serving cell is reported as a signal level corresponding to a value range, the signal level is determined based on mappings of signal levels to value ranges, and the mappings are configured in Reference Signal Information (RSI) received from the serving cell or are pre-defined in a Third generation partnership project (3GPP) specification.

16. The method as claimed in claim 15, wherein the reporting of the signal quality of the serving cell is performed in response to each uplink transmission, or in response to the signal quality of the serving cell being associated with a predetermined signal level, or in response to the monitored signal quality of the serving cell being changed.

17. The method as claimed in claim 15, further comprising:
receiving an RRCRelease message in response to reporting the signal quality of the serving cell to the mobile communication network; and
terminating the SDT procedure in response to the RRCRelease message.

* * * * *